United States Patent

Fukuoka

[15] 3,671,621
[45] June 20, 1972

[54] INJECTION MOLDING METHOD FOR SANDALS

[72] Inventor: Tatsuo Fukuoka, No. 3, 3-Ban, 2-chome-Minami-Fukushima, Tokushima, Japan

[22] Filed: July 1, 1970

[21] Appl. No.: 51,568

[52] U.S. Cl. .............................. 264/244, 18/34 S, 18/42 H, 264/255, 264/334
[51] Int. Cl. .................... B29b 1/00, B29h 7/08, A43d 65/00
[58] Field of Search ................. 18/34 S, 42 H; 264/244, 255, 264/334

[56] References Cited

UNITED STATES PATENTS 3,302,243  2/1967  Ludwig .............................. 264/244 X
3,302,244  2/1967  Ludwig .............................. 264/244 X
3,400,429  9/1968  Ludwig .............................. 18/34 S X Primary Examiner—Robert F. White
Assistant Examiner—Willard E. Hoag
Attorney—Dawson, Tilton, Fallon & Lungmus

[57] ABSTRACT

The method according to the present invention comprises injecting the first resinous material into the first cavity of a movable mold, cooling the material into a cured condition, shifting the movable mold with the cured first material up to the second stational mold, injecting the second resinous material into the second cavity, cooling the second material into a cured condition and finally releasing the articles from the mold.

1 Claim, 6 Drawing Figures

INJECTION MOLDING METHOD FOR SANDALS

The present invention relates to a method for producing a unitary footwear formed of two different thermoplastic resinous materials by means of an injection molding apparatus, and to the apparatus therefor.

One object of the present invention is to provide an improved method for producing a unitary footwear such as a sandal or the like formed of at least two portions of different thermoplastic resinous materials with use of one apparatus in one successive operation.

Another object of the present invention is to provide an apparatus capable for easily and economically molding a unitary structure of such footwear.

In carrying out the invention in one aspect thereof, a method for molding a unitary footwear is provided in which the process comprises the steps of injecting the first thermoplastic resinous material into the first cavity of a movable mold, said first cavity being formed in conformity with shape of a sole portion of the footwear, cooling the material into a cured condition, shifting the movable mold with the cured first material to the second stational mold so as to define the second cavity between the molds at which the cured first material substantially forms a lower wall of the second cavity, said second cavity being formed in conformity with shape of an upper portion of the footwear, injecting the second thermoplastic resinous material into the second cavity, cooling the second material into a cured condition at which the first and the second materials are integrally connected in the form of substantial bond between adjacent surfaces thereof to form a unitary article of the footwear, and finally releasing the article from the mold. Said first and second material are extruded from appropriate nozzles in molten condition.

Further, the apparatus for performing the subject improved method has been built and being in successful operation. In the apparatus there is a pair of stational upper half-molds secured onto a stational part of the apparatus and a pair of movable lower half-molds being arranged in such manner that each of lower half-molds is capable of selectively engaging with the upper half-molds to define the first and the second cavities therebetween. Said first cavity is formed in conformity with shape of a lower portion of the footwear and the second cavity in shape of an upper portion of the footwear. The apparatus further includes means for injecting the first and the second thermoplastic resinous material into the appropriate cavity and means for shifting the lower half-molds to alternately make the lower half-molds engage with respective upper half-molds.

Said lower half-molds are preferably mounted on a turn table being rotatable around the axis thereof and movable along the axis thereof.

The other objects and advantages of the present invention will become apparent from reading the following detailed description and by reference to the accompanying drawings wherein.

Figure 1:
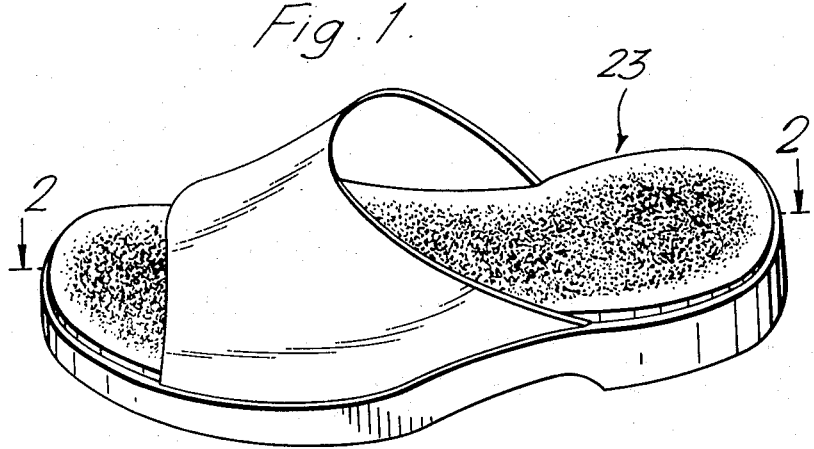
FIG. 1 is a perspective view of a sandal produced by the method and apparatus according to the present invention.

Preferring now to FIGS. 3 to 6 wherein like numerals have been employed to designate similar parts throughout the various figures, it will be seen that one embodiment of the injection molding apparatus according to the present invention is illustrated by the numeral 10.

The apparatus 10 includes an upper and a lower stational plates 11, 12 which are securely supported by a plurality of pillars 13 at a certain distance from one another. Said upper plate 11 has at the back surface thereof a pair of upper half-molds 14 and 15 spaced apart from one another, and these half-molds each serve to define a molding chamber or cavity under assistance of an appropriate movable half-mold as hereinafter described.

Figure 2:
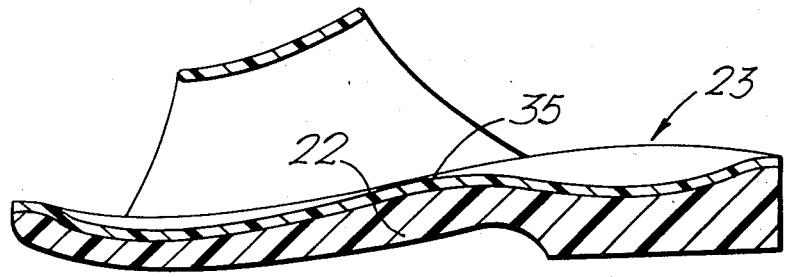
FIG. 2 is a sectional view of the sandal taken along the line 2—2 in FIG. 1.

Designated at 16 is a turn table provided with a pair of movable lower half-molds 17 and 18 at the upper surface thereof, these half-molds being provided with recesses 17A and 17B, respectively, each of which co-operates with the complementary upper half-mold to define the cavity therebetween when the upper and the lower half-molds are engaged. One cavity 20 defined between the upper half-mold 14 and the lower half-mold 17 is provided with a shape in conformity with the outer profile of a sole portion 22 of a sandal 23 as shown in FIGS. 1 and 2, and another cavity 21 defined between the upper half-mold 15 and the lower half-mold 18 being provided with a shape in conformity with a complete outer shape of the sandal 23.

The turn table is carried by a hollow plunger 19 which is actuated by a cylinder mechanism 38 up and down and which is also rotated by a drive shaft 39 communicated with a suitable power source (not shown), so that the turn table 16 may be moved up and down and rotated around the axis of the hollow plunger 19.

A pair of die heads 24 and 25 of injection devices are positioned above the upper plate 11, while injection nozzles 24A and 25A of the die heads are inserted into apertures 26 formed in the upper plate 11, respectively, said apertures each being communicated with the appropriate cavity through a narrow passage 27 formed in the appropriate upper cavity.

One of the die heads designated at 24 is adapted for injecting the first thermoplastic resinous material having resiliency and durability suitable for the sole of the sandal, and another die head 25 being adapted for injecting the second thermoplastic resinous material having strength and flexibility suitable for upper portion 35 of the sandal.

Figure 3:
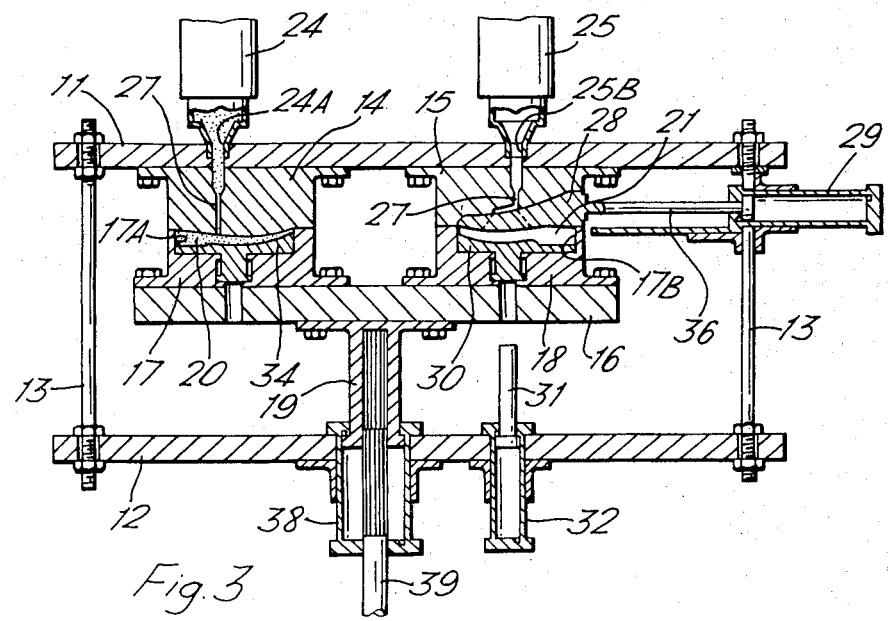
FIGS. 3 to 6 are vertical sectional views of the apparatus according to the present invention, showing various stages of the process in turn.

In FIG. 3, the initial stage of the process according to the present invention is shown in which the turn table 16 is raised up to its most upper position, and the upper and the lower half-molds are engaged with each other so as to define the cavities 20 and 21, respectively. In this state, the first thermoplastic resinous material is injected from the nozzle 24A into the cavity 20 to mold the sole portion 22 of the sandal 23, and after the material within the cavity 20 is cured, the turn table 16 is moved down by the cylinder mechanism 38. Prior to this movement, a core mold 28 inserted between the upper half-mold 15 and the lower half-mold 18 to define the second cavity 21 is rapidly removed from between the half-molds 15 and 18 by means of a cylinder 29 and a connecting arm 36 actuated thereby. When the turn table 16 is moved down, a separable section 30 whose upper surface forms a lower wall of the cavity 21 is raised from the recess 18A of the lower half-mold 18 by a pushing plunger 31 which is also actuated by a cylinder 32, so that finally produced article designated at dotted line 33 as shown in FIG. 4 may be easily removed from the cavity 21.

Figure 5:
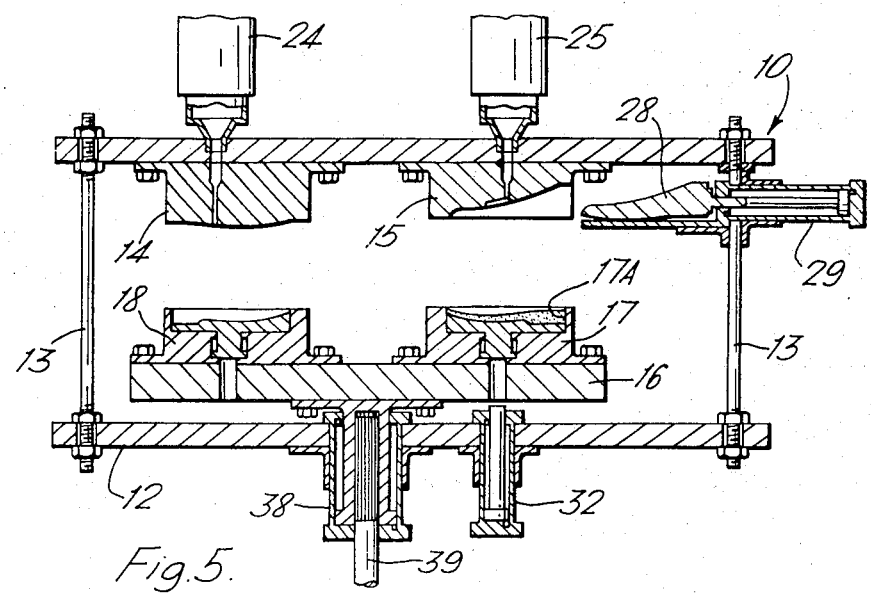

After the pushing plunger 31 is moved down to its most lower position by the cylinder 32, turn table 16 is then rotated by one-second revolution by actuating the drive shaft 39 so as to change the positions of the lower half-molds 17 and 18 each other as shown in FIG. 5. The turn table 16 is then upwardly moved up to a position at which the lower half-mold 17 having the cured first material within the recess 17A is engaged with the upper half-mold 15 and other lower half-mold 18 being engaged with the upper half-mold 14 to define the cavity therebetween. At the same time, the core mold 28 is positioned between the upper and the lower half-molds 15 and 17 so as to define a molding space or the second cavity 40 (see FIG. 6) in conformity with the outer profile of the upper portion 35 of the sandal 23. The second thermoplastic resinous material is then injected from the nozzle 25B into the cavity 40, and simultaneously with the injection of the second material, the first thermoplastic resinous material also is injected from the nozzle 24A into the another cavity 20 defined between the upper and the lower half-molds 14 and 18. The second material and the first material with the cavity 21, when the second material is cured, are integrally reasonably connected with one another in the form of substantial bond between adjacent surfaces thereof without use of any adhesive agent, thereby obtaining a unitary construction of the sandal from two differential thermoplastic resinous materials.

Figure 4:
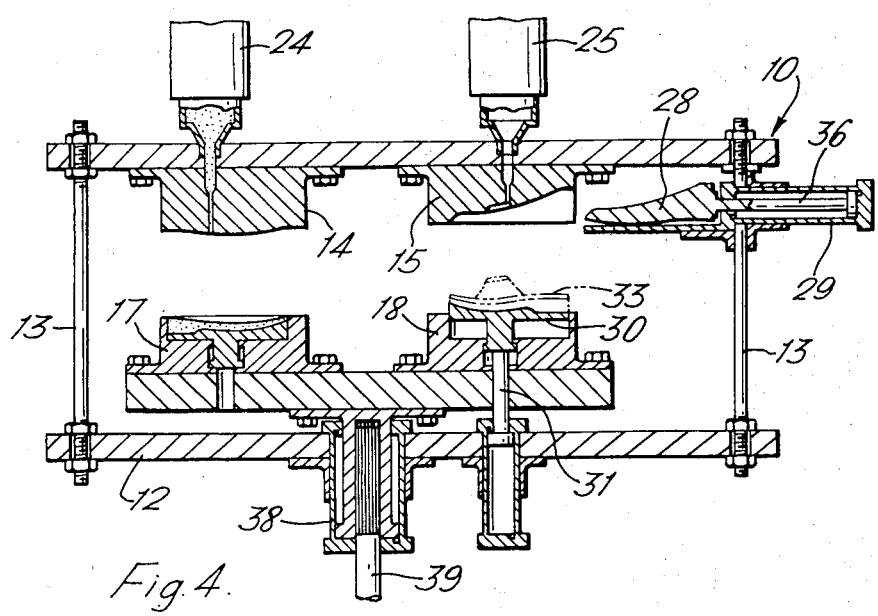
Figure 6:
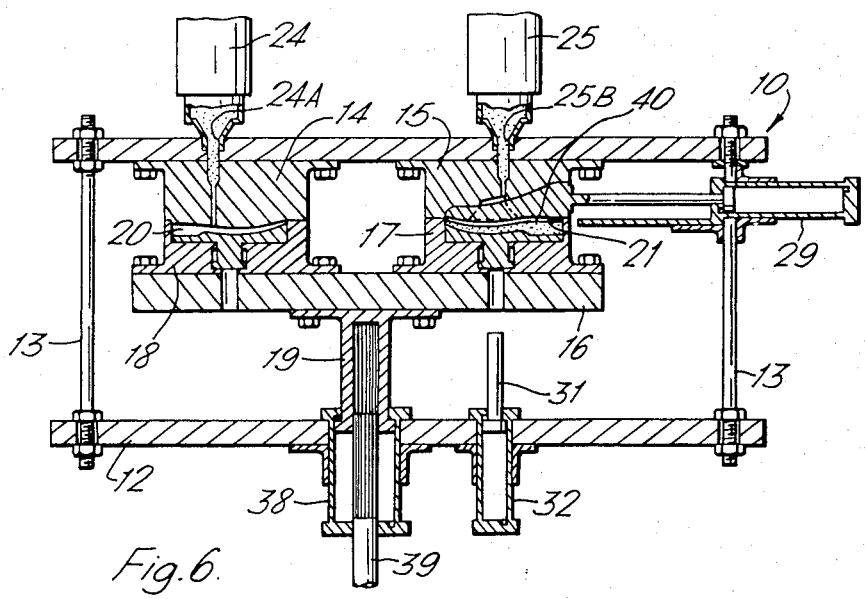

After the stage illustrated in FIG. 6, the movable components are shifted into the position as shown in the FIG. 4, whereby the produced sandal (as shown with dotted line 13) may be easily released from the mold.

It will be apparent that many modifications and variations can be made to the embodiment of the invention. For example, the third nozzle or other nozzles for the third thermoplastic resinous material or the other materials may be added to the above-mentioned embodiment of the apparatus to form the footwear of three or more different materials.

The present invention in its broader aspects is not limited only to the specific embodiments as shown and described in the above but departures may be made therefrom within the scope of the accompanying claims without departing from the principles of the invention and without sacrificing its chief advantages.

What I claim is:

1. A method of producing a unitary sandal comprising the steps of closing a movable mold half with a first stationary mold half to provide a first mold cavity having the shape of the sole portion of the sandal, injecting a first thermoplastic resinous material into the first mold cavity to form a lower sole portion of the sandal, cooling the material into a cured condition, moving the movable mold half and the molded lower sole portion away from the first stationary mold half and toward a second stationary mold half, closing the movable mold half and the lower sole portion with the second stationary mold half, inserting a core mold into the space between the sole portion on the movable mold half and the second stationary mold half either before or after the movable mold half and the stationary mold half are closed, the sole portion, the second stationary mold half and the core mold providing a second mold cavity having the shape of an upper sole portion and a band extending from one side of the upper sole portion to the other side of the upper sole portion and spaced therefrom, injecting a second thermoplastic resinous material into the second mold cavity to form an upper sole portion and a band, cooling the second thermoplastic material into a cured condition to bond the lower sole portion with the upper sole portion and the band to form a unitary sandal, withdrawing the core mold from between the movable mold half and the second stationary mold half, moving the movable mold half and the sandal away from the second stationary mold, and ejecting the sandal from the movable mold half.

* * * * *